United States Patent [19]

Tran

[11] Patent Number: 4,519,826
[45] Date of Patent: May 28, 1985

[54] OPTICAL FIBERS HAVING A FLUORIDE GLASS CLADDING AND METHOD OF MAKING

[75] Inventor: Danh C. Tran, Rockville, Md.

[73] Assignee: The United States of America as represented by the Secretary of the Navy, Washington, D.C.

[21] Appl. No.: 484,764

[22] Filed: Apr. 14, 1983

[51] Int. Cl.³ .................... C03B 37/075; C03B 19/04
[52] U.S. Cl. .................................. 65/3.11; 65/2; 350/96.30
[58] Field of Search .................. 65/3.11, 3.2, 71; 350/96.29, 96.3

[56] References Cited

U.S. PATENT DOCUMENTS

| 3,855,521 | 12/1974 | Greenwood | 65/71 |
| 4,163,654 | 8/1979 | Krohn et al. | 65/3.11 |
| 4,311,501 | 1/1982 | Fort et al. | 65/3.11 |

FOREIGN PATENT DOCUMENTS

| 2414008 | 10/1974 | Fed. Rep. of Germany | 65/3.11 |
| 2614631 | 10/1977 | Fed. Rep. of Germany | 65/3.11 |
| 3000656 | 7/1981 | Fed. Rep. of Germany | 65/71 |
| 57-123843 | 8/1982 | Japan | 65/3.11 |

OTHER PUBLICATIONS

Tran et al.; Electronics Letters, (22nd Jul. 1982), vol. 18, No. 15; pp. 657–658.
Mitachi et al; Japanese Journal of Applied Physics, vol. 21, No. 1, Jan., 1982, pp. L55–L56.
Mitachi et al., "Preparation of Low-Loss Fluoride Glass Fiber", Electronics Letters, vol. 18, No. 4, (2/18/82), (U.S.).

Primary Examiner—Kenneth M. Schor
Attorney, Agent, or Firm—Robert F. Beers; William T. Ellis; Barry A. Edelberg

[57] ABSTRACT

Fluoride glass cladded optical fibers are produced by rotationally casting a fluoride glass cladding tube, introducing core glass melt therein to form a preform, and drawing the preform into a fiber. Disclosed are methods whereby the process may be adopted to the production of multimode, stepped index profile waveguides, single mode waveguides, and waveguides having parabolic index profiles.

9 Claims, 3 Drawing Figures

OPTICAL FIBERS HAVING A FLUORIDE GLASS CLADDING AND METHOD OF MAKING

BACKGROUND OF THE INVENTION

This invention relates generally to optical fibers and more specifically to low-loss optical fibers having a fluoride glass cladding.

Optical waveguides have been known and used for sometime. As noted by M. D. Rigterink, in "Material Systems, Fabrication and Characteristics of Glass Fiber Optical Waveguides", Ceramic Bulletin, Vol. 55, No. 9 (1976), incorporated herein by reference, three basic types of optical waveguides are employed in communications. Multimode, stepped index profile waveguides are used for communications over short distances. As the term multimode implies, these waveguides are generally used in conjunction with an incoherent light source, such as an LED. Considerable pulse broadening occurs because of the variation in path lengths in the core (with constant refractive index) and thus of the arrival times of the various modes at the output end of the fiber.

The single mode type, which supports propagation of only one mode due to the small diameter of the core, is intended for very long distance (many kilometers between repeaters), high capacity communication systems. A solid state laser is usually the light source used with these fibers since it is the only light source capable of launching sufficient power into the single propagating mode. A favorable structure consists of a small diameter core surrounded by a cladding having a slightly smaller refractive index, in turn surrounded by a supporting jacket. The latter serves to increase the strength and chemical durability of the fiber but does not serve any optical role. The respective diameters are typically about 10, 100 and 150 microns. The difference in refractive index between core and cladding are relatively small ($\sim 0.2\%$) compared to other optical fibers. The numerical aperture is thus also small.

For intermediate distance applications, it is preferable to use multimode fibers with a graded index profile. Pulse broadening, resulting from variation in path length of the various modes of light propagating down the waveguide, is reduced as compared to the stepped index multimode fiber. With the graded index profile, most of the light rays travel as helical waves through regions of lower refractive index than exist at the center of the core. The velocity is greater in the regions of lower refractive index so that the arrival times for the various modes are more nearly the same. This results in greater bandwidth capability as the signals can travel for longer distances before degradation occurs because of different mode velocities. Ideally in single mode fibers, the only pulse broadening that occurs is primarily caused by material dispersion (variation of refractive index with wavelength). With the graded index fiber, the core and cladding diameters are typically about 50 and 100 microns and the refractive index difference, $\sim 1\%$.

In addition to pulse-broadening, transmission loss also limits the distance an optical waveguide can carry light. Transmission loss occurs because of several factors. Impurities in the waveguides absorb some of the transmitted light. In addition, thermal compositional fluctuations, phase separations, inhomogeneities within the waveguide as well as geometric variations in the size of the fiber core scatter a portion of the transmitted light. If splices must be made because sufficiently long waveguides may not be produced from available perforns, these splices further increase transmission loss.

Because fluoride glasses are several orders of mangitude more transparent than conventional silica based glass, fluoride glass has been often mentioned as a material from which to make efficient, low-loss optical fibers. Until now, however, several difficulties has made the use of fluoride glass in optical fibers impractical. Conventional cladding techniques, such as a chemical vapor deposition, cannot be used to make a fluoride glass preform because of the high vapor pressures of fluoride raw materials.

Further, to date, optical fibers having a fluoride glass cladding could only be prepared by the process of Mitachi and Miyashita, described in "Preparation of Low-Loss Fluoride Glass Fibers" Electron. Lett., Vol. 18, pp. 170–171 (1982), incorporated herein by reference. According to that process the fluoride cladding melt is poured into a mold which is then upset. The center of the melt flows out and a cylindrical tube is thus formed. Next, the fluoride core melt is poured in to form a preform. The limitations and disadvantages of this process are as follows:

(a) Due to the rapid change in the fluoride glass viscosity with respect to temperature, the cylindrical tube obtained by upseting the mold is not concentric which leads to undesirable variations in the preform core-clad ratio.

(b) Again due to this high viscosity dependence on temperature, the preparation of long preforms, and therefore long waveguides, is not possible.

(c) And finally, this process appears to be limited to step-index multimode fluoride fibers.

OBJECTS OF THE INVENTION

It is an object of this invention to produce fluoride glass optical fibers having uniform cladding and core diameters.

Another object is to produce low-loss, high efficiency optical fibers suitable for communications over long distances.

A further object of the invention is to reduce the number of splices in the transmission that are required to enable optical communication over long distance.

Still another object of the present invention is to produce fluoride glass optical fibers having a parabolic index profile as well as the production of single mode fluoride glass optical fibers.

SUMMARY OF THE INVENTION

These and other objects are achieved by pouring cladding glass into a thermally-conductive vertically disposed rotating mold. The mold is then rotated about its vertical axis to allow the cladding glass to coat the bore surface of the mold. The mold is then rapidly changed to a horizontal position while continuing rotation. The centrifugal force from rotation causes the mold to uniformly coat the bore surface of the mold. Rotation is continued until the temperature of the fluoride cladding glass approaches about the temperature of the mold, thus forming a cladding tube. Core glass melt may then be introduced into the cladding tube, thus forming a preform. The preform may then be drawn into an optical fiber.

BRIEF DESCRIPTION OF THE DRAWINGS

The exact nature of this invention, as well as other objects and advantages thereof will be readily apparent from consideration of the following specification and drawing in which like reference numerals designate like parts throughout the figures thereof and wherein.

DESCRIPTION OF THE PREFERRED EMBODIMENTS

Figure 1:
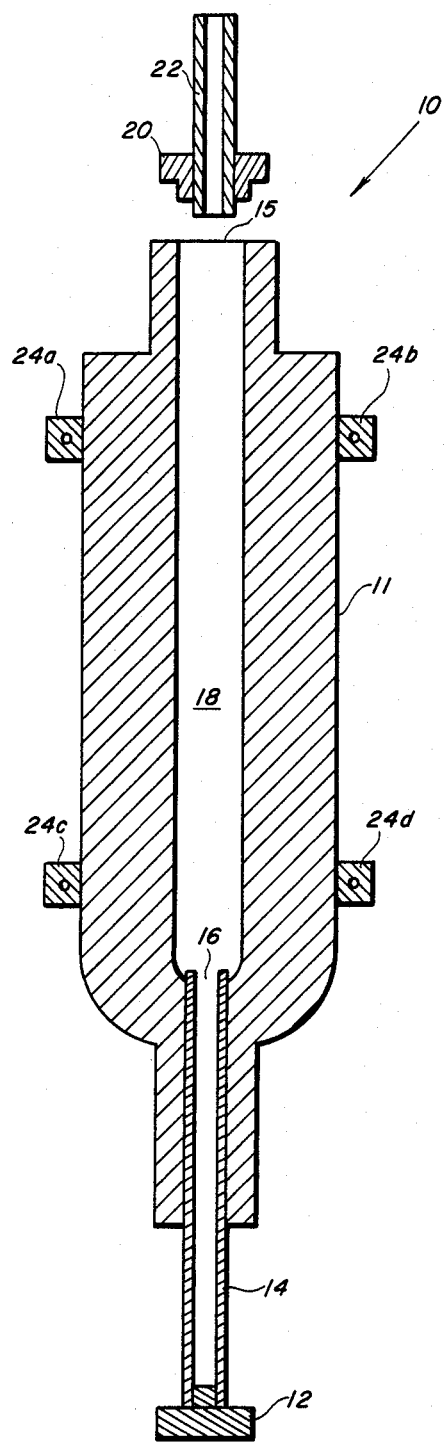
FIG. 1 shows an exploded cross-sectional view of a preferred apparatus for carrying out a preferred embodiment of the process of the invention.

To carry out this process, cladding glass is heated to about 400° to 550° C. above the glass transition temperature (tg) to form a melt. For a fluoride cladding glass, this corresponds to a melting temperature of about 650°–850° C. A vertically-disposed, thermally-conductive, tubular mold is axially rotated, preferably at about 2000–5000 rpm, and most preferably at about 2500–3500 rpm. In this description, and the claims that follow, the term "thermally-conductive mold" refers to a mold which allows heat transfer with sufficient quickness to essentially prevent the crystallization of fluoride glass when the molten form of such glass is introduced into the mold and solidifies therein. The mold should be heated to about 50° C. below the transition temperature of the cladding glass. For fluoride cladding glass, this translates into a temperature of about 200° C. Then, the cladding glass melt is introduced into the rotating mold, typically by pouring. After the cladding glass melt has coated essentially the entire bore surface of the mold, typically about three seconds, the rotating mold is rapidly, almost instantaneously, shifted to a horizontal disposition while axial rotation is continued at least until the cladding melt and the mold are in thermal equilibrium, typically about five to ten seconds, thus forming a cladding tube. Alternatively, a fluoride glass can be prepared by melting the raw materials directly in the rotating mold followed by a rapid quench to tg and a final annealing step. The fluoride glass raw materials may be best introduced into the mold by sublimation. After the raw materials have condensed about the inside walls of the mold, the raw materials are melted and then mixed by the rotation of the mold. By this process, a cladding glass of very high purity may be made. Core melt is then introduced into the cladding tube and allowed to solidify, forming a preform. Fibers may then be drawn from the preform according to traditional methods. To prevent crystallization, the heat zone during drawing should be as small as possible, preferably less than about 7 mm long.

The introduction of the core melt into the cladding tube is preferably acomplished by either suction or positive pressure. Generally, the cladding tube is fixed inside of a coaxial tubular mold in intimate contact with the outer surface of the tube for support. Each end of the mold is preferably tapered and must be open. One end of the mold is placed into the core melt. If it is desired to introduce the core melt by suction, the other end of the mold is connected to a vacuum line. The vacuum then draws the core melt into the tube. The vacuum line is then sealed off and the core melt allowed to solidify. If it is desired to introduce the core melt by positive pressure the other end of the mold is left unconnected. Sufficient pressure is applied to the core melt surrounding the inserted end of the mold to force the core melt into the cladding tube.

Other means may be used to introduce the core glass into the cladding tube. For example, core melt may be poured down a glass bait rod into the cladding tube, or the cladding tube may be dipped into the core melt. While these methods have proven successful, suction and positive pressure result in significantly less bubble formation. As between suction and positive pressure, positive pressure is preferred. Suction occasionally causes deformation of the cladding tube by collapsing it inward. When positive pressure is used, the mold acts as a support for the cladding tube and prevents the cladding tube's deformation. In all cases, the core should be introduced into the cladding tube while the tube is at about 450°–550° C., to prevent cracking of the core glass from thermal shock.

The mold used is preferably inert and thermally conductive. In this disclosure and the claims that follow, the term "inert" means unreactive to fluoride glass, noncrystal inducing, and non-impurity inducing. Most preferably, the mold should be made out of brass, aluminum, or copper. The mold should also be coated on its bore surface with a substance capable of preventing the fluoride glass from attacking the mold, such as gold or platinum, if the bore surface is otherwise susceptible to attack by fluoride glass.

The process of this invention may also be used for creating optical fibers having a parabolic index profile. Successive rotational castings of thin layers of glasses of increasing refractive indices may be made. The middle gap may be closed by collapsing the tube under vacuum. Single mode fluoride glass fibers may be prepared by spraying a thin layer of core melt along the inner surface of a cladding tube made in accordance with the process of this invention. The middle gap may be closed under vacuum. Single mode fibers may also be produced by the suction or positive pressure technique described above if a suitably shaped and sized mold is used. Suction and positive pressure allow for the production of preforms having a core diameter smaller than can be achieved by pouring core melt down a bait rod into a cladding tube or dipping the core melt into a cladding tube. To prevent cracking of the cladding tube, the cladding tube should preferably be at or slightly above its tg whenever core melt is introduced therein.

FIG. 1 shows preferred apparatus 10 for carrying out the process of this invention. Mold 11 having an inert plug 12 inserted in tube 14 (preferably made of platinum or gold) and positioned to be flush with with the top of the tube at point 16 is heated to just above the tg of the cladding glass. Mold 11 is then inserted and fixed into the chuck of a lathe or suitable rotating device (not shown) in the vertical position with tube 14 at the lower end of mold 11. The cladding melt is poured into mouth 15 of mold 11 to partially fill cavity 18. Cap 20, which encircles tube 22 (also preferably made of platinum or gold), is immediately inserted into mouth 15 of mold 11 and mold 11 is rotated at a high velocity as mold 11 and rotating device are quickly dropped to the horizontal position. When the clad glass temperature drops to a few degrees above its tg the rotation is stopped, plug 12 is removed from tube 14, mold 11 is removed from the rotating device and a vacuum liine with a closed finger-valve (not shown) is connected onto tube 22. Tube 14 is inserted into the core glass melt (not shown) and the finger-valve is opened, reducing the pressure in the tube, and allowing the core melt to enter thru tube 14 and fill the cladding tube (not shown). The valve is closed when tube 22 fills and when the core temperature drops to within a few degrees of tg mold 11 is placed in an annealing over. Mold 11 is best constructed from two concentric halves, joined by fasteners at holes 24a, 24b, 24c and 24d for easy removal of the finish preform from mold 11.

Alternatively, the core melt may be introduced into mold 11 by allowing tube 22 to remain disconnected. Plug 12 is removed from tube 14 and tube 14 is inserted into the melt. Pressure is then applied to the surrounding melt, forcing the melt through tube 14 to fill the cladding tube. The valve is closed when tube 22 fills and when the core temperature drops to within a few degress of tg, apparatus 10 is placed in an annealing oven.

Figure 2:
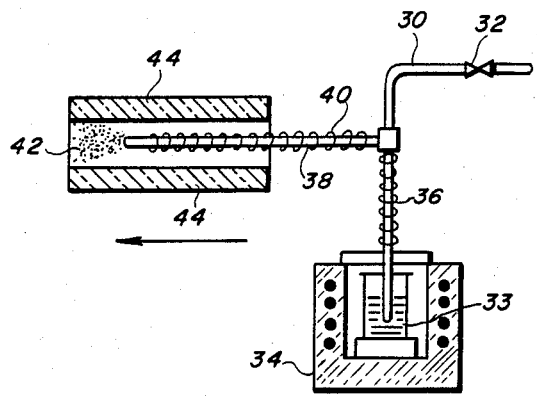
FIG. 2 shows a partial cross-section of an apparatus for making preforms having a parabolic index profile according to the process of the invention.

FIG. 2 shows the preferred apparatus for making preforms suitable for drawing into optical fibers having a parabolic index profile. Furnace 34 holds container of core melt 33 at a temperature sufficient to maintain the fluid nature of the melt. Drawing tube 36 and main tube 38 are made of platinum and are heated by heating coils to prevent solidification of the melt. Main tube 38 extends along the longitudinal axis of cladding tube 44, and terminates at the end in atomizing nozzle 42. Argon gas flows through tube 30 into main tube 38 and through nozzle 42, its pressure being controlled by pressure regulator 32. This gas flow creates a suction, which draws core melt from container 33 along draw tube 36, into main tube 38 and through nozzle 42, whereupon the core melt sprays the inner surface of rotating cladding tube 44. The cladding tube is held in a mold (not shown) heated to about the transition temperature of the cladding glass, and is moved along the direction of the arrow so that its entire inner surface is coated. This process is repeated with core melts of successively larger indices of refraction. The middle gap is then closed by suction, forming a cladding tube having a parabolic index profile.

EXAMPLES

Having thus fully described the invention, the following examples are illustrative only and are not intended to limit the scope of the invention is any manner.

Figure 3:
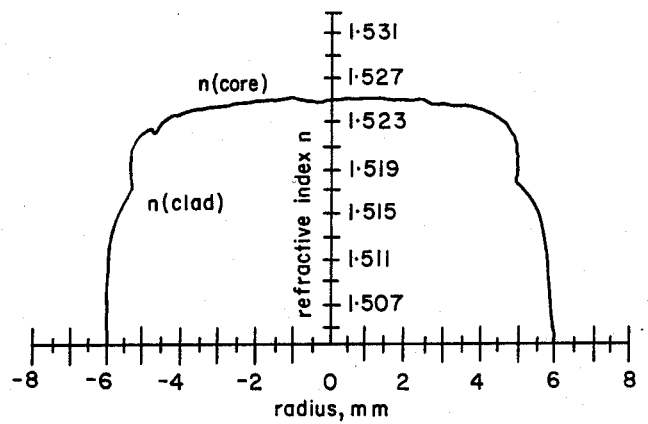
FIG. 3 shows a step-index profile of a preform made according to the process of the invention. The diameter of the preform is 10.6 mm, the cladding thickness is 0.7 mm.

The core and cladding glass compositions and corresponding glass transition temperature (tg), crystallisation temperature (tx), expansion coefficient ($\alpha$), and refractive index (n) are listed in Tables 1 and 2. Fiber preforms were prepared from paired compositions I and II, II and III, and I and III; the last combination yielded the highest numerical aperture of 0.2. The fluoride glass samples were melted using technical grade fluorides in capped platinum crucibles under an argon atmosphere at 850° C. for 60 min. A glass melt was poured into a 6 in long goldcoated cylindrical mould preheated at around tg and was then rotated with an Emco Compact 5 lathe at speeds $\geq$3000 rev/min. A highly concentric fluoride cladding glass tube whose inner diameter was precisely controlled by the initial volume of injected glass was thus obtained. There was no detectable variation in wall thickness along the entire length of the tube, and no bubbles were observed. The core glass was next transferred to the tube eight by pouring the melt down a fluoride glass bait rod or by dipping the tube into the core melt in order to avoid bubble formation. A preform step-index profile obtained from a York Technology Model P101 Preform Analyser is illustrated in FIG. 3.

Fluoride-glass-cladded preforms were drawn into fibers using a resistance ring furnace with a localised heat zone about 7 mm long. The drawing speed was around 40 m/min and the drawing temperature was set at 315±5° C. Long-length fluoride glass fibers of core diameters and cladding thicknesses ranging from 7–150 microns and from 10–30 microns, respectively, were prepared. The optial loss in these fibers was presently as high as 0.2–0.5 dB/m at 2.0 microns due to water, metal impurities in the technical grade fluoride raw materials, and drawing-induced scattering defects. Fiber losses should improve dramatically with proper control of fiber drawing parameters, and with the use of high-purity starting materials and controlled atmospheric melting and drawing.

TABLE 1

| | CORE AND CLADDING FLUORIDE GLASS COMPOSITIONS | | | | | |
|---|---|---|---|---|---|---|
| Glass composition mole % | $ZrF_4$ | $BaF_2$ | $LaF_3$ | $AlF_3$ | LiF | $PbF_2$ |
| I | 53 | 19 | 5 | 3 | 20 | |
| II | 51.3 | 17 | 5 | 3 | 20 | 3.7 |
| III | 51 | 16 | 5 | 3 | 20 | 5 |

TABLE 2

| | FLUORIDE GLASS PHYSICAL PROPERTIES | | | |
|---|---|---|---|---|
| Glass compositions | tg °C. | tx$^a$ °C. | $\alpha$ °C.$^{-1} \times 10^{-5}$ | n (at 0.63 $\mu$m) |
| I | 275 | 357 | 1.41 (45–255° C.) | 1.512 |
| II | 254 | 345 | | 1.517 |
| III | 257 | 360 | 1.34 (45–195° C.) | 1.525 |

$^a$tx = crystallization temperature

As shown in FIG. 3, the step index profile of the preform of compositions II and III formed by the procedures described above is relatively symmetrical along the vertical access of the preform. Thus, the step index profile indicates that the composition of the cladding is uniform and the cladding cross-section is highly circular, and that likewise, the composition of the core is uniform and the core cross-section is highly circular.

Further details and discussion relating to this invention may be found in D.C. Tran et al., "Fluoride Glass Preforms Prepared By a Rotational Casting Process," Electronics Letters, Vol. 18, No. 15, pp. 657-58 (1982), and in D.C. Tran et al., "Record and Invention of Disclosure for Navy Case No. 67,354" (1983), both of which are incorporated herein by reference.

Obviously, many modifications and variations of the present invention are possible in the light of the above teachings. For example, a mold may be made thermally conductive by placing it in a refrigerated environment or passing a refreigerent about is periphery. It is therefore to be understood that, within the scope of the appended claims, the invention may be practiced otherwise than as specifically described.

What is claimed is:

1. A method of forming an optical fiber having a core and fluoride glass cladding comprising the steps of:

axially rotating a vertically-disposed, thermally-conductive tubular mold containing a fluoride glass cladding melt until said cladding melt has coated essentially the entire bore surface of said mold;

rapidly tilting the mold, while continuing to axially rotate said mold, until said mold becomes horizontally disposed;

continuing to axially rotate said mold at least until said cladding melt has evenly coated the bore surface of said mold;

rapidly cooling said cladding melt until its temperature is about equal to that of said mold, thus forming a cladding tube;

introducing a glass core melt suitable for producing optical fibers into said cladding tube to form a preform;

removing said preform from said mold; and drawing said preform to form an optical fiber.

2. The method of claim 1 wherein the step of introducing a core melt into said cladding tube comprises the step of introducing a core melt consisting essentially of fluoride glass melt into said cladding tube.

3. The method of claim 2 wherein said core melt is introduced into said cladding tube by suction.

4. The method of claim 2 wherein said core melt is introduced into said cladding tube by positive pressure.

5. The method of claim 2 wherein successive layers of said core melt are introduced into said cladding tube by spraying said core melt along the inside surface of said cladding tube.

6. The method of claim 2 wherein said mold rotates at about 2000–5000 rpm.

7. The method of claim 6 wherein said mold rotates at about 2000–3500 rpm.

8. The method of claim 1 further comprising the step of preparing said fluoride glass cladding melt by melting the raw material for said fluoride glass melt directly in said rotating mold.

9. The method of claim 1 further comprising the step of heating said mold to about 50° C. below the transition temperature of said cladding melt before introducing said cladding melt into said mold.

* * * * *